(12) United States Patent
Pan

(10) Patent No.: US 6,663,249 B2
(45) Date of Patent: Dec. 16, 2003

(54) INSTRUMENT PANEL WITH DIFFERENT COLORED ILLUMINATION

(75) Inventor: Chi-Hsiang Pan, Taipei (TW)

(73) Assignee: Pro-Plus Inc., Tucheng (TW)

( * ) Notice: Subject to any disclaimer, the term of this patent is extended or adjusted under 35 U.S.C. 154(b) by 0 days.

(21) Appl. No.: 09/933,167

(22) Filed: Aug. 21, 2001

(65) Prior Publication Data

US 2003/0039111 A1 Feb. 27, 2003

(51) Int. Cl.[7] ............................................. G01D 11/28
(52) U.S. Cl. ....................... 362/23; 362/27; 362/29; 362/800; 362/802; 362/545; 362/489
(58) Field of Search ............................. 362/23, 27, 29, 362/489, 545, 800, 802; 340/815.45, 815.67

(56) References Cited

U.S. PATENT DOCUMENTS 4,217,625 A * 8/1980 Klein ........................... 362/30
5,741,058 A * 4/1998 Suzuki et al. ................. 362/27

* cited by examiner

Primary Examiner—Sandra O'Shea
Assistant Examiner—Bertrand Zeade
(74) Attorney, Agent, or Firm—Leong C. Lei

(57) ABSTRACT

An instrument panel includes a housing having an open end, an instrument body having a dial and arranged within the housing, a red light-emitting diode mounted on the dial, a green light-emitting diode mounted on the dial, a blue light-emitting diode mounted on the dial, a control means fitted within the housing and electrically connected with the red, green and blue light emitting diodes for selectively controlling the light emitting diodes to give light, and a cover mounted on the open end of the housing for keeping the instrument body within the housing, whereby the instrument panel can emit lights with different colors as desired.

1 Claim, 3 Drawing Sheets

INSTRUMENT PANEL WITH DIFFERENT COLORED ILLUMINATION

BACKGROUND OF THE INVENTION

1. Field of the Invention

This invention is related to an instrument panel and in particular to one which can emit lights with different colors as desired.

2. Description of the Prior Art

The conventional dashboard for automobiles is provided with a lighting means for making it easier to observe the reading in the dashboard in case of insufficient light. However, the lighting means is simply a light bulb thereby making the dashboard look dull and monotonous. Hence, it has been proposed to use an electroluminescent device to make it look more interesting. Nevertheless, the electroluminescent device has only one color and cannot provide lights with different colors thus making it still unsatisfactory in use.

Therefore, it is an object of the present invention to provide an instrument panel which can obviate and mitigate the above-mentioned drawbacks.

SUMMARY OF THE INVENTION

This invention is related to the structure of an instrument panel.

It is the primary object of the present invention to provide an instrument panel which can emit lights with different colors as desired.

According to a preferred embodiment of the present invention, an instrument panel includes a housing having an open end, an instrument body having a dial and arranged within the housing, a red light-emitting diode mounted on the dial, a green light-emitting diode mounted on the dial, a blue light-emitting diode mounted on the dial, a control means fitted within the housing and electrically connected with the red, green and blue light emitting diodes for selectively controlling the light emitting diodes to give light, and a cover mounted on the open end of the housing for keeping the instrument body within the housing.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
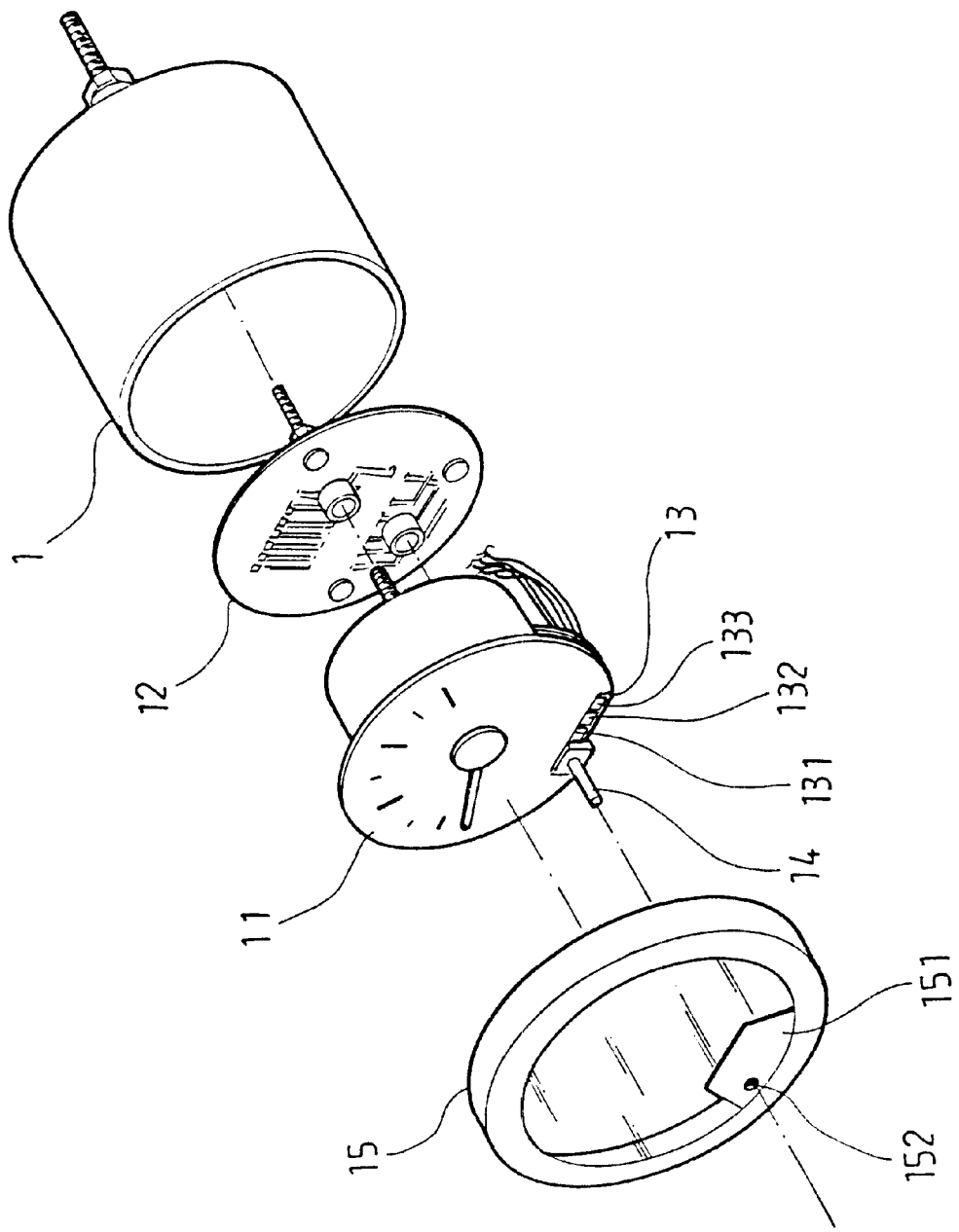
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

Figure 2:
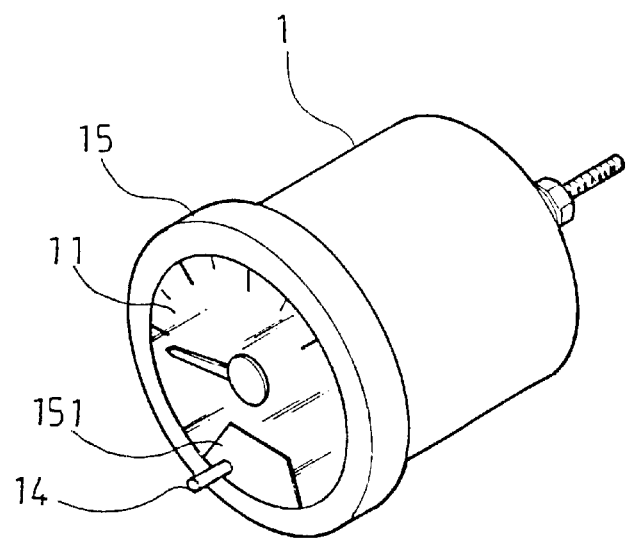
FIG. 2 is a perspective view of the present invention.

With reference to the drawings and in particular to FIGS. 1 and 2 thereof, the instrument panel according to the present invention generally comprises a cylindrical housing 1 having an open end, an instrument 11 disposed within the cylindrical housing 1 and provided with light emitting diodes 13, a control circuit 12 arranged within the cylindrical housing 1 and electrically connected with the light emitting diodes 13, and a cover 15 engaged with the open end of the cylindrical housing 1 for keeping the instrument 11 within the cylindrical housing 1. The light emitting diodes 13 is composed of a red light emitting diode 131, a green light emitting diode 132 and a blue light emitting diode 133 which are electrically connected to the control circuit 12 so that the control circuit 12 can control the light emitting diodes 131, 132 and 133 to produce different lights as desired.

The cover 15 is provided with a reflective lug 151 which extends inwardly from the circumferential edge thereof The reflective lug 151 has a hole 152 for the passage of a switch 14 mounted on the instrument 11. The switch 14 is electrically connected with the control circuit 12. By means of the switch 14, the control circuit 12 can be adjusted to selectively control the light emitting diodes to give light thereby generating lights of different colors via the reflection of the reflective lug 151.

Figure 3:
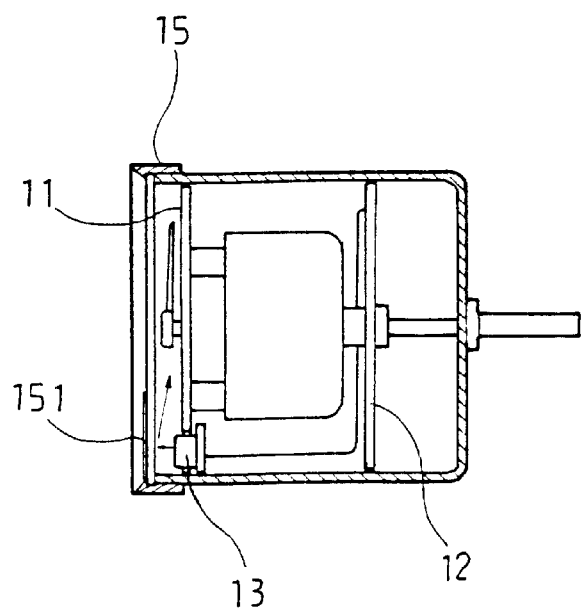
FIG. 3 is a sectional view of the present invention.

Referring to FIG. 3, the light emitting diodes 13 are positioned under the reflective lug 151 of the cover 15 so that when the light emitting diodes 13 give light, the light will be reflected by the reflective lug 151 and the inner circumference of the cover 15 thereby illuminating the instrument panel with different colors.

Figure 4:
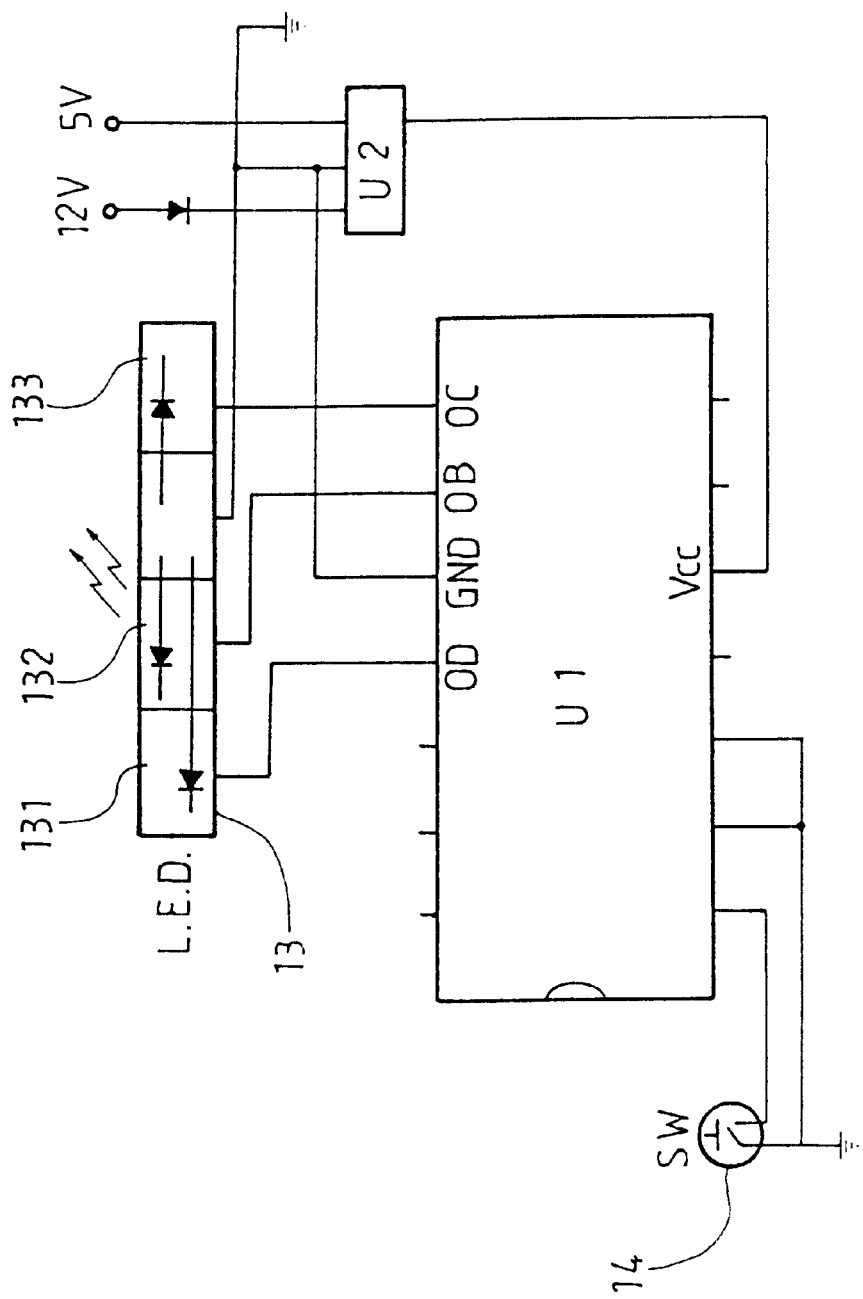
FIG. 4 is a circuit diagram of the present invention.

FIG. 4 is a circuit diagram of the control circuit 12. As shown, the control circuit 12 is provided with a BCD (binary coded decimal) integrated circuit 12. The output ends of the integrated circuit U1 are connected with the light emitting diodes 131, 132 and 133, while the control end of the integrated circuit 12 is connected to the switch 14, so that by means of the switch 14, the control circuit 12 will output different codes to selectively control the light emitting diodes to give light as desired. The working voltage for the integrated circuit 12 and the light emitting diodes 131, 132 and 133 are supplied by an integrated circuit U2.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:
1. An instrument panel comprising:
   a housing having an open end;
   an instrument body having a dial and arranged within said housing;
   a red light-emitting diode mounted on said dial;
   a green light-emitting diode mounted on said dial;
   a blue light-emitting diode mounted on said dial;
   a control means fitted within said housing and electrically connected with said red, green and blue light emitting diodes for selectively controlling said light emitting diodes to give light, said control means includes a BCD (binary coded decimal) integrated circuit;
   a cover mounted on said open end of said housing for keeping said instrument body within said housing, said cover being provided with a reflective lug which extends inwardly from a circumferential edge thereof, said reflective panel having a hole for passage of said switch; and
   a switch mounted on said dial and electrically connected with said control means for selectively controlling said light emitting diodes to give light.

* * * * *